United States Patent [19]
Le

[11] Patent Number: 4,826,110
[45] Date of Patent: May 2, 1989

[54] OSCILLATORY FAILURE MONITOR

[75] Inventor: Linh T. Le, Seattle, Wash.

[73] Assignee: The Boeing Company, Seattle, Wash.

[21] Appl. No.: 64,423

[22] Filed: Jun. 22, 1987

[51] Int. Cl.$^4$ .......................................... B64C 13/16
[52] U.S. Cl. ................... 244/194; 244/76 R; 244/78; 318/564; 91/363 A
[58] Field of Search .............. 244/194, 195, 76 R, 244/181, 78; 318/564, 565; 91/363 A, 358 A, 361

[56] References Cited
U.S. PATENT DOCUMENTS

| | | | |
|---|---|---|---|
| 3,462,662 | 8/1969 | Carpenter | 318/565 |
| 3,741,073 | 6/1973 | Garjost | 91/363 A |
| 3,826,174 | 7/1974 | Platt et al. | 91/363 A |
| 4,094,481 | 6/1978 | DeWalt | 244/194 |
| 4,304,375 | 12/1981 | Builta et al. | 318/564 |

Primary Examiner—Galen Barefoot
Attorney, Agent, or Firm—Conrad O. Gardner; B. A. Donahue

[57] ABSTRACT

Prevention of actuator oscillation due to failure mode in an aircraft pitch axis control system is provided by an oscillatory failure monitor. The oscillatory failure monitor provides power shutdown of the actuator through inner loop modeling and error signal processing of inner loop disturbances.

3 Claims, 3 Drawing Sheets

OSCILLATORY FAILURE MONITOR

BACKGROUND OF THE INVENTION

The present invention relates to oscillatory failure monitors and more particularly to an oscillatory failure monitor for a pitch axis control system.

Failure monitors have been utilized heretofore in aircraft flight control systems as exemplified by U.S. Pat. No. 4,094,481 which utilizes a dual channel servo-system for signal comparison.

In contrast it is an object of the present invention to provide inner loop modeling in a pitch axis control system with further error signal processing of inner loop disturbances.

In accordance with a preferred embodiment of the present invention, signal processing is provided of an error signal generated through a disturbance in the inner loop of a pitch axis control system. An inner loop model circuit of the inner loop of the pitch axis control system is provided to generate the error signal. Error signal processing of inner loop disturbances includes amplification, rectification, signal level detection and integration by filter circuit means with subsequent critical threshold level determination wherein upon critical threshold level detection the affected actuator power is switched off.

For a better understanding of the invention, its operating advantages and objects, reference should be made to the specification and accompanying drawings in which:

DESCRIPTION OF THE PREFERRED EMBODIMENTS

Figure 1:
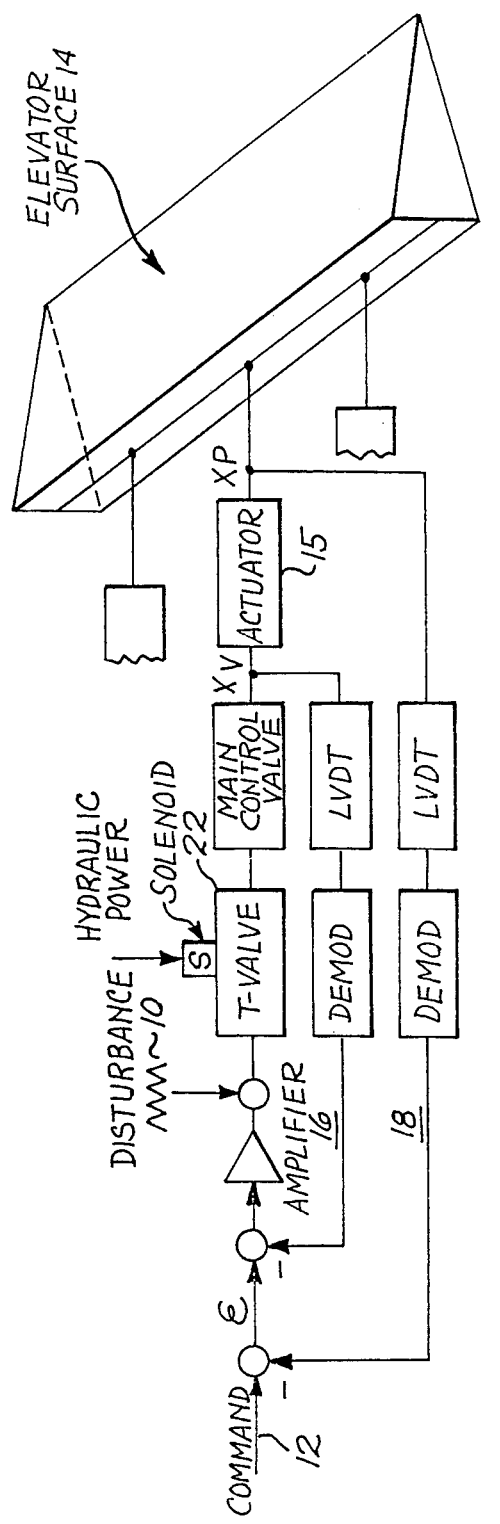
FIG. 1 is a schematic block diagram of prior second order pitch axis control system with inner loop and outer loop.

Turning now to FIG. 1, a prior pitch axis control system is shown in which a pitch axis command signal 12 controls movement of the elevator surface 14 of the aircraft. Such a pitch axis control system may have failure modes which cause one or more actuators e.g. 15 to oscillate and in turn cause flutter or excessive loading on the aircraft. Such failures must be detected and disabled immediately upon their occurrence to prevent the aforementioned flutter or excessive loading of the aircraft. Apart from detecting and disabling failures due to disturbance signals 10, the present oscillatory failure monitor must be able to tolerate sudden spikes and/or short term transients (i.e. electrical power transients, momentary EMI pick up and avoid shutting down the pitch axis control system prematurely). In the pitch axis control system of FIG. 1 having an outer loop 18, and an inner loop 16, a disturbance signal 10 in inner loop 16 can cause the valve 22 and actuator 15 to oscillate. Such oscillation may accumulate critical fatigue damages at the actuator 15 and/or the elevator surface 14.

Figure 2:
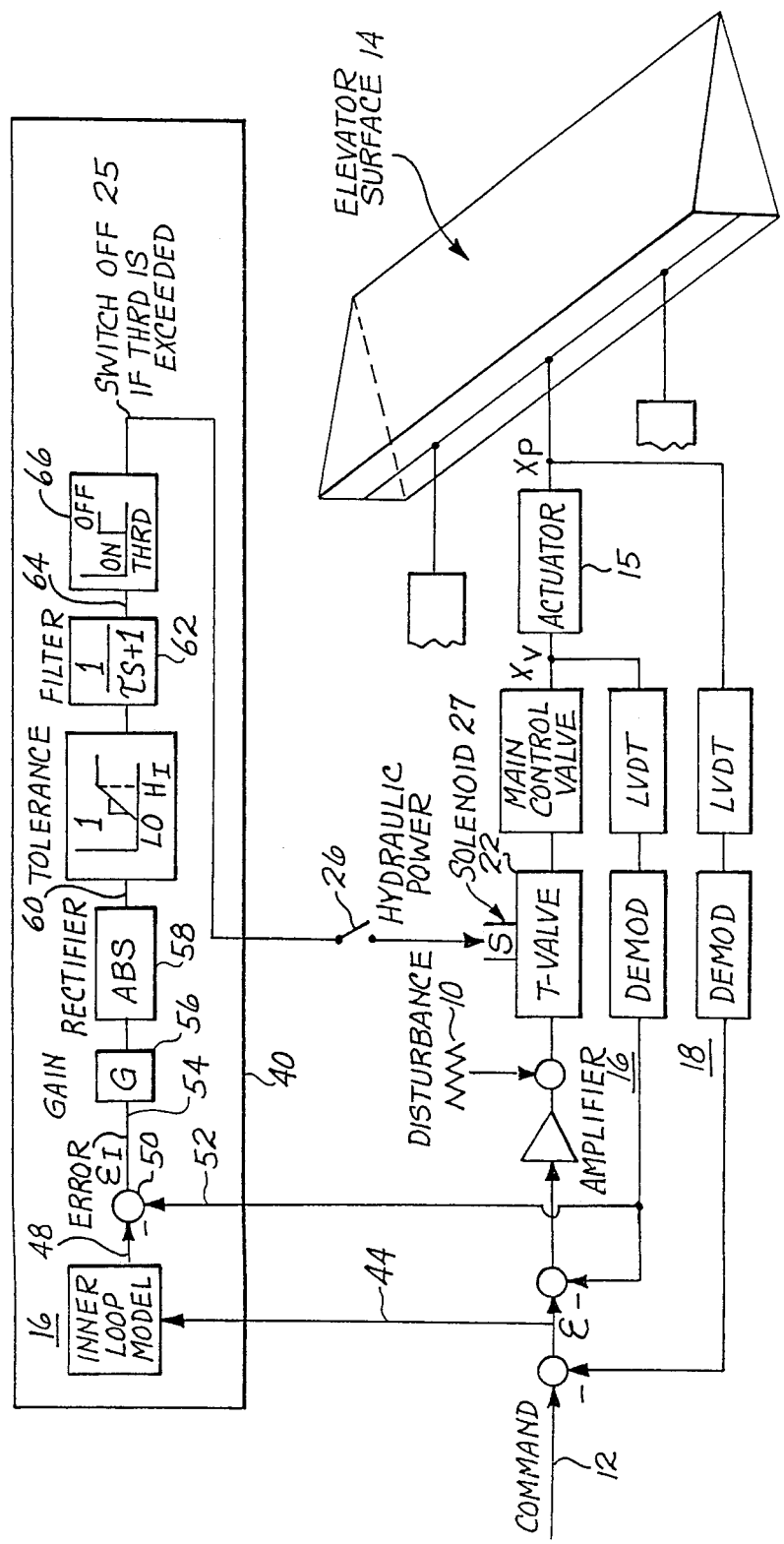
FIG. 2 is a system block diagram of the pitch axis control system of FIG. 1 including a preferred embodiment of the present oscillatory failure monitor; and, FIG. 3 is a graph illustrative of the performance characteristics of the oscillatory failure monitor utilized in the pitch axis control system of FIG. 2.

The present oscillatory failure monitor 40 can be seen in FIG. 2 to include a further inner loop 16 with further signal processing circuitry downstream to provide a switch off control signal 25 for turning off hydraulic power through switching means 26 connected to the solenoid 27 of valve 22. The conventional inner loop 16 is thus seen to be utilized in oscillatory failure monitor 40 to provide a further feedback circuit. An input signal 44 derived from outer control loop 18 of the pitch axis control system is connected to the input of the inner loop circuit 16. The output signal 48 from inner loop circuit 16 in oscillatory failure monitor 40 is then provided as a first input to combining circuit means 50, a further input signal 52 is provided to combining circuit means 50. Further input signal 52 is derived from inner loop 16 of the pitch axis control system. An output error signal "$E_f$" denoted by numeral 54 comprising the output of combining circuit means 50 is then coupled through an amplifier circuit 56 and rectifier circuit 58 for providing an absolute value signal 60. Absolute value signal 60 is then integrated in filter circuit 62 to provide an integrated signal 64 when absolute value 60 exceeds a predetermined "LO" level to e a "HI" level signal. Threshold level determining circuit 66 provides a switch off signal 25 when the integrated signal 64 exceeds a critical threshold level and it is desired to shut off hydraulic power to actuator 15. The upper or "HI" level on the tolerated error signal is provided to prevent occasional large spikes from causing filter circuit means 62 to exceed its threshold. Accordingly, oscillatory or static errors are detected after an effective time delay.

Figure 3:
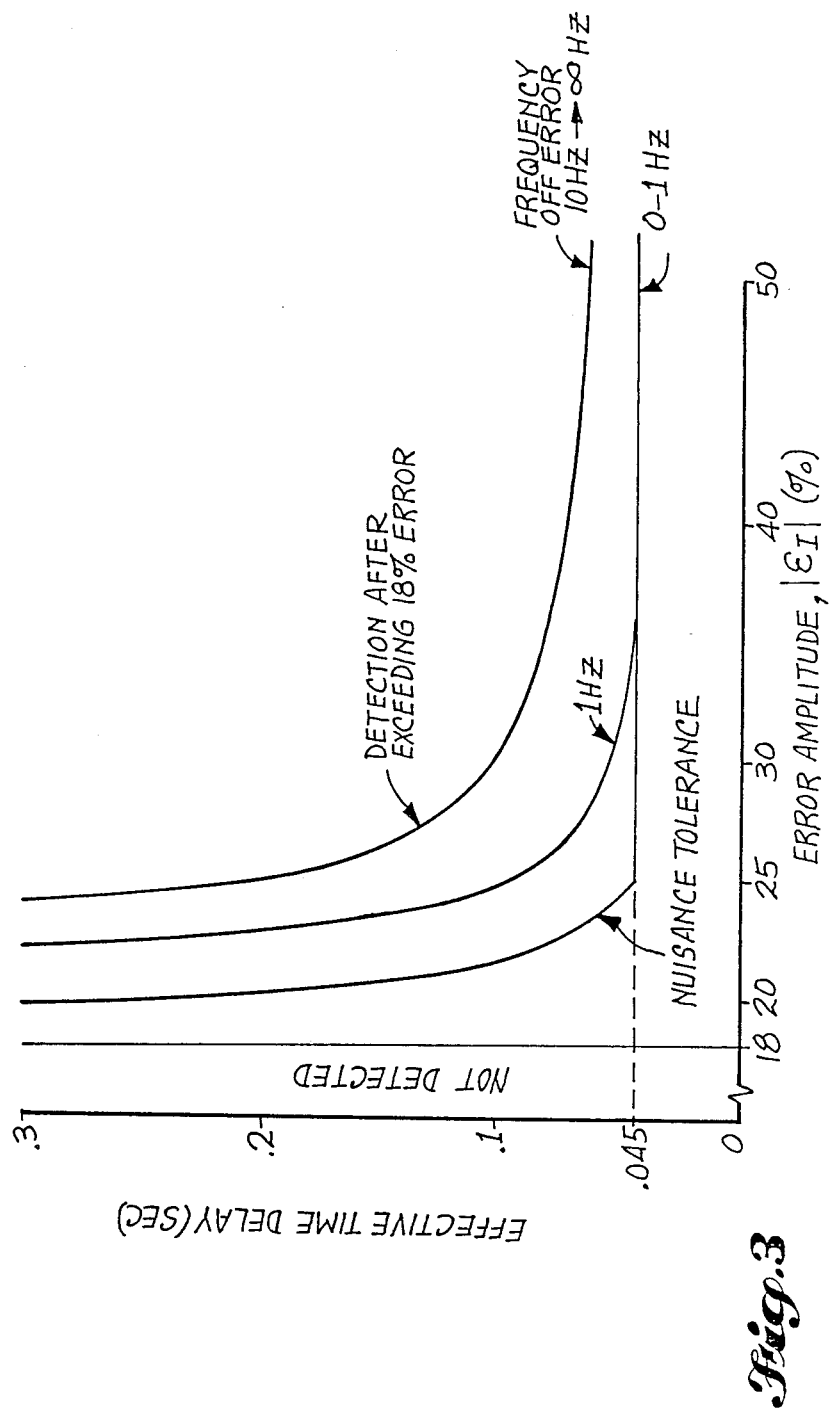

A spectrum of the effective time delay versus error signal "$E_f$" magnitude at 54 and frequency is shown in the graph of FIG. 3 for the following typical set of parameters.

$$G = \frac{100}{X_{VMAX}} \text{ where } X_{VMAX} = .115 \text{ inch (max valve travel)}$$

| | | |
|---|---|---|
| LO | = | 18 (%) |
| HI | = | 25 (%) |
| $\tau$ | = | .2 second |
| THRD | = | 1.4 = $\tau$(HI − LO) |

FIG. 3 will enable those skilled in the art to appreciate present oscillatory failure monitor 40's ability to:

(a) detect failures in a predictable length of time
(b) avoid nuisance shut down due to component tolerances and momentary system transients.

What is claimed is:

1. In combination in a pitch axis control system having inner and outer loop control circuits for processing a pitch axis command signal to provide elevator surface control by an actuator:

an oscillatory failure monitor circuit coupled to said pitch axis control system inner and outer loop control circuits and responsive to a disturbance signal for switching off power to said actuator; and, said oscillatory failure monitor circuit including an inner loop model circuit of said pitch axis control system inner loop control circuit for providing an error signal generated through a disturbance in said pitch axis control system inner loop control circuit.

2. The invention according to claim 1 wherein said oscillatory failure monitor circuit comprises amplifier, rectifier and filter circuit means coupled to said pitch axis control system inner and outer loop control circuits for providing a switch off signal for turning off hydraulic power in said pitch axis control system when the threshold level of an integrated output signal from said filter circuit means exceeds a predetermined value.

3. A pitch axis control system comprising:

a first inner loop control system;

an outer loop control system;

said first inner loop control system and said outer loop control system responsive to a pitch axis command signal for providing actuator powered elevator surface control; and, a further first inner loop control system coupled to said pitch axis control system for switching off said actuator powered elevator surface control upon the occurrence of a disturbance signal in said pitch axis control system, said further first inner loop control system providing detection of oscillatory or static errors subsequent to a time delay.

* * * * *